(12) United States Patent
Morita et al.

(10) Patent No.: US 8,599,462 B2
(45) Date of Patent: Dec. 3, 2013

(54) DISPLAY DEVICE

(75) Inventors: Takeomi Morita, Mobara (JP);
Masataka Okamoto, Chonan (JP);
Takahiko Muneyoshi, Chiba (JP);
Shigeki Nishizawa, Mobara (JP);
Katsumi Matsumoto, Mobara (JP)

(73) Assignee: Pixtronix, Inc., San Diego, CA (US)

( * ) Notice: Subject to any disclaimer, the term of this patent is extended or adjusted under 35 U.S.C. 154(b) by 0 days.

(21) Appl. No.: 13/539,708

(22) Filed: Jul. 2, 2012

(65) Prior Publication Data

US 2013/0016419 A1    Jan. 17, 2013

(30) Foreign Application Priority Data

Jul. 12, 2011  (JP) ................................. 2011-153520

(51) Int. Cl.
*G02B 26/02*  (2006.01)
*G09G 3/34*  (2006.01)

(52) U.S. Cl.
USPC ............ 359/230; 359/227; 345/108; 345/109

(58) Field of Classification Search
CPC .... G02B 26/02; G02B 26/0841; G02B 26/04; G09G 3/3433
USPC ........ 345/55, 84, 85, 108, 109; 359/227, 230, 359/233
See application file for complete search history.

(56) References Cited

U.S. PATENT DOCUMENTS

| 2006/0250325 | A1 | 11/2006 | Hagood et al. | |
| 2009/0103164 | A1* | 4/2009 | Fijol et al. ..................... | 359/290 |
| 2012/0293851 | A1* | 11/2012 | Morita et al. .................. | 359/228 |
| 2012/0307331 | A1* | 12/2012 | Okamoto et al. ............. | 359/228 |
| 2013/0038918 | A1* | 2/2013 | Ando et al. ................... | 359/228 |
| 2013/0077146 | A1* | 3/2013 | Nishizawa ..................... | 359/230 |

FOREIGN PATENT DOCUMENTS

| JP | 2008-197668 | 8/2008 |
| WO | WO 2006/091738 A1 | 8/2006 |

* cited by examiner

*Primary Examiner* — David N Spector
(74) *Attorney, Agent, or Firm* — Edward A. Gordon; Foley & Lardner LLP

(57) ABSTRACT

A display device includes a first substrate; a second substrate; a plurality of pixels; a shutter mechanism section formed in correspondence with each of the pixels, a fluid sealed in an space between the first substrate and the second substrate; and an impact absorption section located to face one substrate among the first substrate and the second substrate, on the side opposite to the side on which the fluid is located. The shutter mechanism section is formed on the second substrate and includes a movable shutter section for controlling a light transmittance of each of the pixels. The impact absorption section includes a third substrate located to face the one substrate, on the side opposite to the fluid, a sealing section for bringing together the one substrate and the third substrate, and a predetermined gap formed among the one substrate, the third substrate and the sealing section.

15 Claims, 11 Drawing Sheets

DISPLAY DEVICE

CROSS-REFERENCE TO RELATED APPLICATIONS

This application is based upon and claims the benefit of priority from the prior Japanese Patent Application No. 2011-153520, filed on 12 Jul. 2011, the entire contents of which are incorporated herein by reference.

FIELD

The present invention relates to a display device in which the intensity of light transmitted through each of pixels is controlled by movement of a light-blocking member.

BACKGROUND

Conventionally, there are display devices in which the intensity of light transmitted through each of a plurality of pixels formed in a display panel is controlled to display an image. For example, in liquid crystal display devices, the intensity of light transmitted through each pixel is controlled by changing alignment directions of liquid crystal molecules. Display devices of another type in which the intensity of light transmitted through each pixel is controlled by mechanically moving a light-blocking member have been proposed (see, for example, Japanese Laid-Open Patent Publication No. 2008-197668).

In a display device described in Japanese Laid-Open Patent Publication No. 2008-197668, light-transmissive regions capable of transmitting light are provided in a substrate included in the display device. One light-transmissive region is provided in correspondence with each of a plurality of pixels. The display device also includes a shutter mechanism section which is formed in correspondence with the shape of the light-transmissive region and includes a movable light-blocking member. The intensity of light transmitted through each pixel is controlled by movement of the light-blocking member driven by the shutter mechanism section.

However, the display device described in Japanese Laid-Open Patent Publication No. 2008-197668 has a problem that when the display device is impacted on as a result of, for example, falling, the shutter mechanism section is easily damaged.

The present invention made in light of the above situation has an object of providing a display device capable of improving the impact resistance thereof.

SUMMARY

A display device in an embodiment according to the present invention includes a first substrate; a second substrate facing the first substrate; a plurality of pixels; a shutter mechanism section formed on the second substrate in correspondence with each of the pixels, and having a movable shutter section for controlling a light transmittance of each of the pixels; a fluid sealed in a space between the first substrate and the second substrate; and an impact absorption section including a third substrate located to face one substrate among the first substrate and the second substrate, on the side opposite to the side on which the fluid is located, a sealing section for bringing together the one substrate and the third substrate, and a predetermined gap formed among the one substrate, the third substrate and the sealing section.

In a display device in an embodiment according to the present invention, in the above-described embodiment, a fluid of the same material as that of the fluid sealed in the space between the first substrate and the second substrate is sealed in the predetermined gap. In addition, the fluid is silicone oil or fluorine oil.

In a display device in an embodiment according to the present invention, in the above-described embodiment, a first injection opening for injecting the fluid into the space between the first substrate and the second substrate and a second injection opening for injecting the fluid into the predetermined gap are provided; and the first injection opening and the second injection opening overlap each other at least partially when seen in a plan view. In addition, the first injection opening and the second injection opening are formed at the same position when seen in a plan view.

In a display device in an embodiment according to the present invention, in the above-described embodiment, the predetermined gap is filled with air. Alternatively, the predetermined gap is filled with an impact absorption material. The impact absorption material may be a gel material or a reaction-curable resin.

In a display device in an embodiment according to the present invention, in the above-described embodiment, the impact absorption section includes a fourth substrate facing the third substrate on the side opposite to the one substrate and a second predetermined gap formed between the third substrate and the fourth substrate. In addition, the impact absorption section includes a plurality of fourth substrates facing each other and located to face the third substrate on the side opposite to the one substrate and a plurality of second predetermined gaps formed between the third substrate and one of the plurality of fourth substrates and between the plurality of fourth substrates; and the plurality of fourth substrates and the plurality of second predetermined gaps are located alternately.

In a display device in an embodiment according to the present invention, in the above-described embodiment, the display device further includes an illumination section located to face the other substrate among the first substrate and the second substrate which is not the one substrate; wherein the illumination section outputs light toward the plurality of pixels from the side of the other substrate.

In a display device in an embodiment according to the present invention, in the above-described embodiment, the first substrate includes a light-blocking film having a plurality of first openings; each of the plurality of pixels has at least one of the plurality of first openings; the shutter section has at least one second opening; and each of the plurality of pixels transmits light from the illumination section via the first opening and the second opening.

DESCRIPTION OF EMBODIMENTS

Hereinafter, preferable embodiments of a display device according to the present invention will be described with reference to the drawings.

Embodiment

Figure 1:
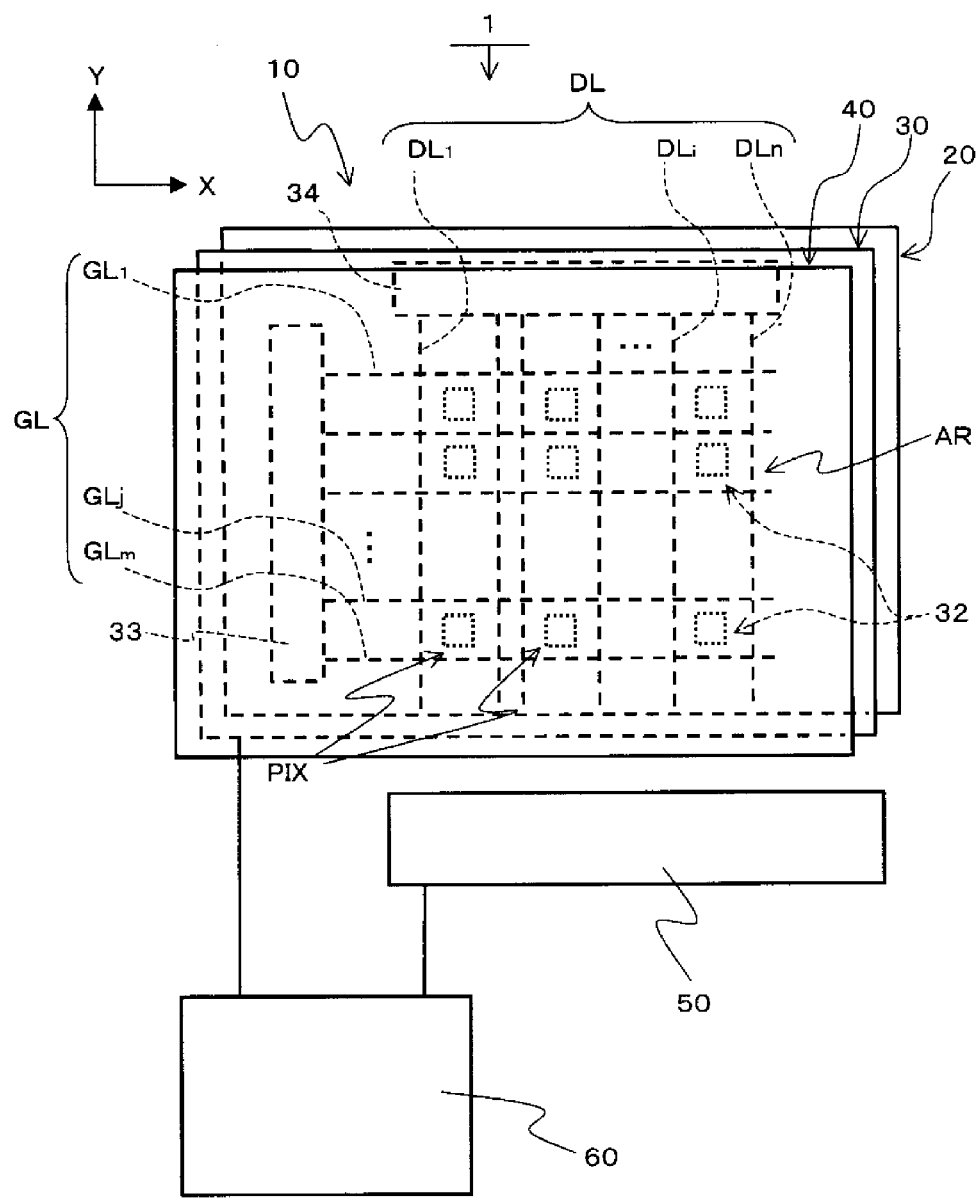
FIG. 1 is a schematic view showing an entire structure of a display device in an embodiment according to the present invention.
Figure 2:
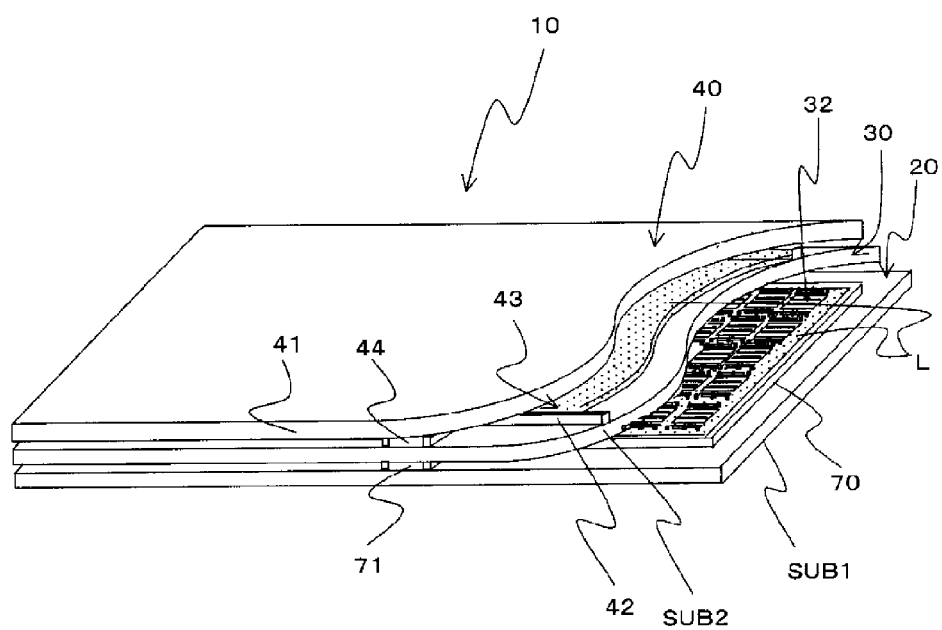
FIG. 2 is a partially cut-away isometric view of a display panel shown in FIG. 1.
Figure 3:
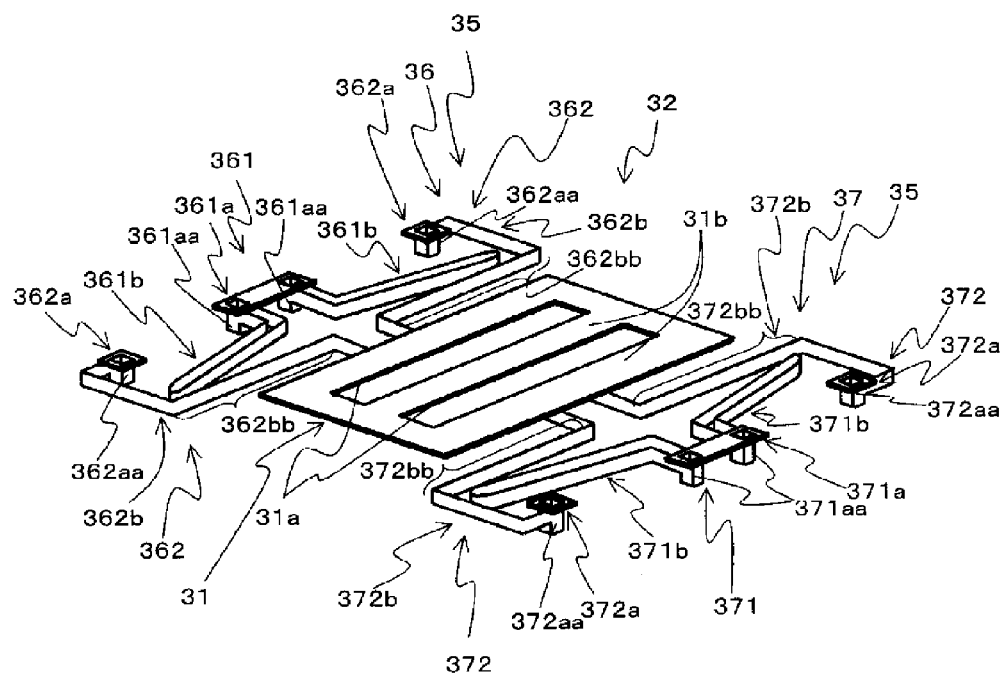
FIG. 3 is an enlarged isometric view of a shutter mechanism section shown in FIG. 2.
Figure 4:
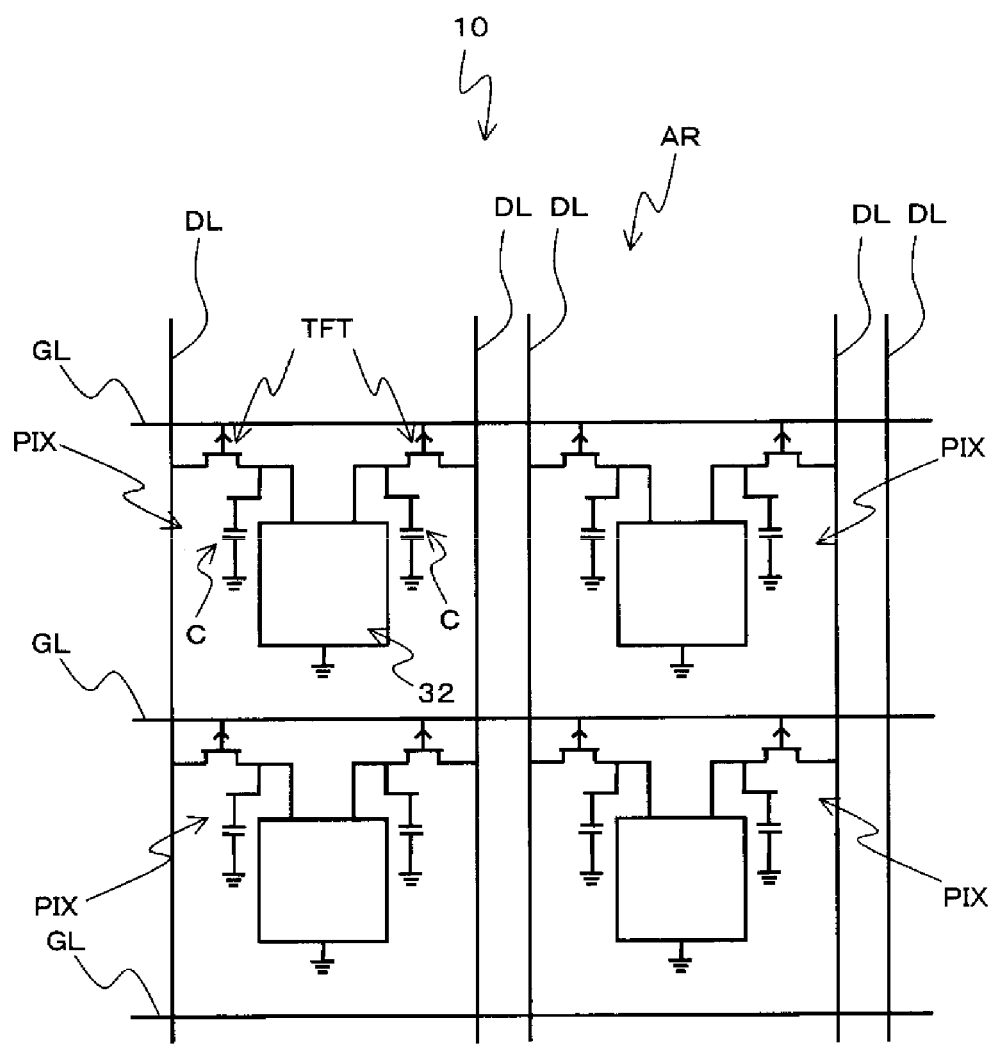
FIG. 4 is an equivalent circuit diagram of a display region of the display panel shown in FIG. 1.

FIG. 1 is a schematic view showing an entire structure of a display device 1 in an embodiment according to the present invention. FIG. 2 is a partially cut-away isometric view of a display panel 10 shown in FIG. 1. FIG. 3 is an enlarged isometric view of a shutter mechanism section 32 shown in FIG. 2. FIG. 4 is an equivalent circuit diagram of a display region AR of the display panel 10 shown in FIG. 1.

The display device 1 in this embodiment according to the present invention includes the display panel 10, an illumination device 50 and a control section 60.

First, the display panel 10 will be described. As shown in FIG. 1 and FIG. 2, the display panel 10 includes a first substrate 20, a second substrate 30, a work fluid L (described later) held by the first substrate 20 and the second substrate 30, and an impact absorption section 40.

The first substrate 20 is provided in a rear part of the display panel 10 and is capable of transmitting light on a pixel-by-pixel basis. The first substrate 20 includes a light-transmissive substrate SUB1 (described later) formed of glass or the like and a light-absorptive resin film BM (light-blocking film) which is provided by vapor deposition on a top surface of the light-transmissive substrate SUB1. The light-absorptive resin film BM is formed of a light-absorptive material such as, for example, carbon black, titanium black or the like. The light-absorptive resin film BM is formed substantially on the entirety of the top surface of the light-transmissive substrate SUB1, except that the light-absorptive resin film BM is removed at pixels PIX. At the position corresponding to each pixel PIX, light-transmissive sections A (openings; see FIG. 5 and FIG. 6) are formed, so that light is transmitted through the light-transmissive sections A (openings).

The second substrate 30 includes a plurality of shutter mechanism sections 32 each for moving a shutter section 31 (described later) acting as a light-blocking member. One shutter mechanism section 32 is provided for each pixel PIX. The second substrate 30 is located to face the first substrate 20 in the state where the work fluid L is held between the first substrate 20 and the second substrate 30. The second substrate 30 includes a plurality of scanning lines GL ($GL_1, \ldots, GL_j, \ldots GL_m$; where j and m are natural numbers), a plurality of data lines DL ($DL_1, \ldots, DL_i, \ldots, DL_n$; where i and n are natural numbers), a scanning driver 33, a data driver 34 and the plurality of shutter mechanism sections 32.

The scanning lines GL extend in the display region AR of the second substrate 30 in an X direction in FIG. 1, and are parallel to each other in a Y direction. The data lines DL extend in the Y direction and are parallel to each other in the X direction. The scanning lines GL and the data lines DL are insulated from each other at intersections thereof. Each of areas surrounded by the gate lines GL and the data lines DL is the pixel PIX.

The scanning driver 33 supplies scanning signals to the scanning lines GL sequentially from the scanning line GL at the top to the scanning line GL at the bottom in FIG. 1. Each of the scanning lines GL is extended to have end connected to the scanning driver 33.

The data driver 34 supplies video signals to the data lines DL at the timings when the scanning signals are supplied.

The shutter mechanism sections 32 each change the intensity of light transmitted through each pixel PIX by moving the shutter section 31 described later. More specifically, one shutter mechanism section 32 is provided, for each pixel PIX, on a surface of the second substrate 30 facing the work fluid L. The shutter mechanism section 32 transmits light from the illumination device toward a display plane, or blocks the light from the illumination device, on a pixel-by-pixel basis.

As shown in FIG. 3, the shutter mechanism section 32 includes the shutter section 31 and an actuator section 35.

The shutter section 31 is a rectangular plate and acts as a light-blocking member. The shutter section 31 has a shape corresponding to the shape of the light-transmissive sections A described later. Specifically, the shutter section 31 has openings 31a and light-blocking sections 31b such that light transmitted through the light-transmissive sections A is transmitted through, or blocked by, the shutter section 31. In FIG. 3, the shutter section 31 has two openings 31a, but the number of the openings is not limited to two and may be one or three or more.

The actuator section 35 includes an opening actuator 36 and a closing actuator 37.

The opening actuator 36 drives the shutter section 31 to be in an open state, namely, to pass the light from the illumination device 50. More specifically, the opening actuator 36 moves the shutter section 31 to a position where the two openings 31a of the shutter section 31 face the light-transmissive sections A. The opening actuator 36 includes a first electrode section 361 and a second electrode section 362.

The first electrode section 361 includes a first potential application section 361a and a pair of first movable sections 361b.

The first potential application section 361a includes support sections 361aa and is provided with an electric potential.

The pair of first movable sections 361b each have one end which is a fixed end connected to a top part of the corresponding support section 361aa of the first potential application section 361a and the other end which is a free end. Each first movable section 361b is formed such that the free end approaches a corresponding straight section 362bb (described later) of the second electrode section 362 as much as possible.

The second electrode section 362 includes a pair of second potential application sections 362a and a pair of second movable sections 362b.

The pair of second potential application sections 362a each include a support section 362aa and is provided with an electric potential.

The pair of second movable sections 362b each have one end connected to a top part of the support section 362aa of the corresponding second potential application section 362a and the other end connected to the shutter section 31. Each second movable section 362*b* includes the straight section 362*bb* parallel to an end surface of the shutter section 31 in a shorter direction.

When potentials are applied such that the first potential application section 361*a* and each second potential application section 362*a* have a potential difference of a predetermined level or greater, the pair of first movable sections 361*b* and the pair of second movable sections 362*b* are attracted to each other, from the free ends of the first movable sections 361*b*, which are close to the pair of second movable sections 362*b*. As a result, the shutter section 31 is moved toward the opening actuator 36. The shutter section 31 thus moved is located at a position where the openings 31*a* face the light-transmissive sections A described later.

By contrast, the closing actuator 37 drives the shutter section 31 to be in a closed state, namely, to block the light from the illumination device 50. More specifically, the closing actuator 37 moves the shutter section 31 to a position where the light-blocking sections 31*b* of the shutter section 31 face the light-transmissive sections A. The closing actuator 37 includes a first electrode section 371 and a second electrode section 372.

The first electrode section 371 includes a first potential application section 371*a* and a pair of first movable sections 371*b*.

The first potential application section 371*a* includes support sections 371*aa* and is provided with an electric potential.

The pair of first movable sections 371*b* each have one end which is a fixed end connected to a top part of the corresponding support section 371*aa* of the first potential application section 371*a* and the other end which is a free end. Each first movable section 371*b* is formed such that the free end approaches a corresponding straight section 372*bb* (described later) of the second electrode section 372 as much as possible.

The second electrode section 372 includes a pair of second potential application sections 372*a* and a pair of second movable sections 372*b*.

The pair of second potential application sections 372*a* each include a support section 372*aa* and is provided with an electric potential.

The pair of second movable sections 372*b* each have one end connected to a top part of the support section 372*aa* of the corresponding second potential application section 372*a* and the other end connected to the shutter section 31. Each second movable section 372*b* includes the straight section 372*bb* parallel to an end surface of the shutter section 31 in the shorter direction.

When potentials are applied such that the first potential application section 371*a* and each second potential application section 372*a* have a potential difference of a predetermined level or greater, the pair of first movable sections 371*b* and the pair of second movable sections 372*b* are attracted to the pair of first movable sections 367*b*, from the free ends of the first movable sections 371*b*, which are close to the pair of second movable sections 372*b*. As a result, the shutter section 31 is moved toward the closing actuator 37. The shutter section 31 thus moved is located at a position where the light-blocking sections 31*b* face the light-transmissive sections A described later.

As shown in FIG. 2, the work fluid L (fluid; e.g., oil) is sealed in a space between the first substrate 20 and the second substrate 30 by a sealing section 70 formed to be frame-like. A material suitable for the work fluid L (fluid) has a relative dielectric constant for reducing the driving voltage of the shutter mechanism section 32, has a viscosity which allows the work fluid L to act as a lubricant, and a high light transmittance. For example, silicone oil or fluorine oil is usable as the work fluid L (fluid). The display panel 10 has a first injection opening 71 for injecting the work fluid L to the space between the first substrate 20 and the second substrate 30.

Owing to the shutter mechanism section 32 having such a structure, the intensity of light transmitted through each pixel PIX is controlled by the movement of the shutter section 31.

The impact absorption section 40 has an impact absorbing function for dispersing an impact applied to the display panel 10. The impact absorption section 40 includes a light-transmissive substrate 41 located to face the second substrate 30 while there is a gap between the substrates 41 and 30, a sealing section 42 formed to be frame-like between the second substrate 30 and the light-transmissive substrate 41, and an accommodation space 43 (predetermined gap) formed by the second substrate 30, the light-transmissive substrate 41 and the sealing section 42. The accommodation space 43 has the work fluid L injected thereinto as an impact absorption material.

The light-transmissive substrate 41 is a light-transmissive plate formed of, for example, glass or the like.

The sealing section 42 is formed of, for example, a synthetic resin containing bead-like spacers therein, seals the work fluid L in the accommodation space 43 (prescribed gap), and holds the second substrate 30 and the light-transmissive substrate 41 while a predetermined gap is held therebetween. The sealing section 42 has a second injection opening 44 for injecting the work fluid L into the accommodation space 43. The second injection opening 44 is located close to the first injection opening 71 (e.g., at the same position when seen in a plan view, or at a position overlapping the first injection opening 71 at least partially when seen in a plan view).

When an impact is applied to the display panel 10, the impact absorption section 40 having such a structure disperses the impact throughout the plane of the display panel 10 by means of the light-transmissive substrate 41 and the work fluid L in the accommodation space 43. Moreover, since the second injection opening 44 is located close to the first injection opening 71, the work fluid L can be easily injected, at the same time, into the space between the first substrate 20 and the second substrate 30 and into the accommodation space 43 of the impact absorption section 40 through both of the second injection opening 44 and the first injection opening 71.

The illumination device 50 is realized by a light emitting diode or the like. The illumination device 50 is located on the rear side of the display panel 10, and outputs light, as an illumination section, from the rear side of the viewing plane of the display panel 10.

The control section 60 is realized by a CPU or the like, is electrically connected to each of the above-described elements of the display device 1 and controls the entire operation of the display device 1. The control section 60 may include a memory or the like (not shown) for temporarily storing video data input from an external system.

Now, a structure of a pixel PIX of the display panel 10 will be described. As shown in FIG. 4, each pixel PIX has one scanning line GL and two data lines DL for performing address designation of each column of the pixels PIX. One of the two data lines DL is for sending a signal to drive the shutter section 31 to be in an open state, and the other data line DL is for sending a signal to drive the shutter section 31 to be in a closed state.

Each pixel PIX includes two thin film transistors TFT and two capacitors C. A gate of each of the two thin film transistors TFT is electrically connected to the scanning line GL. A source of one of the two thin film transistors TFT is electrically connected to the data line DL for sending a signal to drive the shutter section 31 to be in an open state. A drain of this thin film transistor TFT is electrically connected parallel to one electrode of one of the capacitors C of the pixel PIX and to one of the potential application sections of the opening actuator 36. The other electrode of this capacitor C is grounded.

Similarly, a source of the other thin film transistor TFT in the pixel PIX is electrically connected to the data line DL for sending a signal to drive the shutter section 31 to be in a closed state. A drain of this thin film transistor TFT is electrically connected parallel to one electrode of the other capacitor C of the pixel PIX and one of the potential application sections of the closing actuator 37. The other electrode of this capacitor C is grounded.

Figure 5:
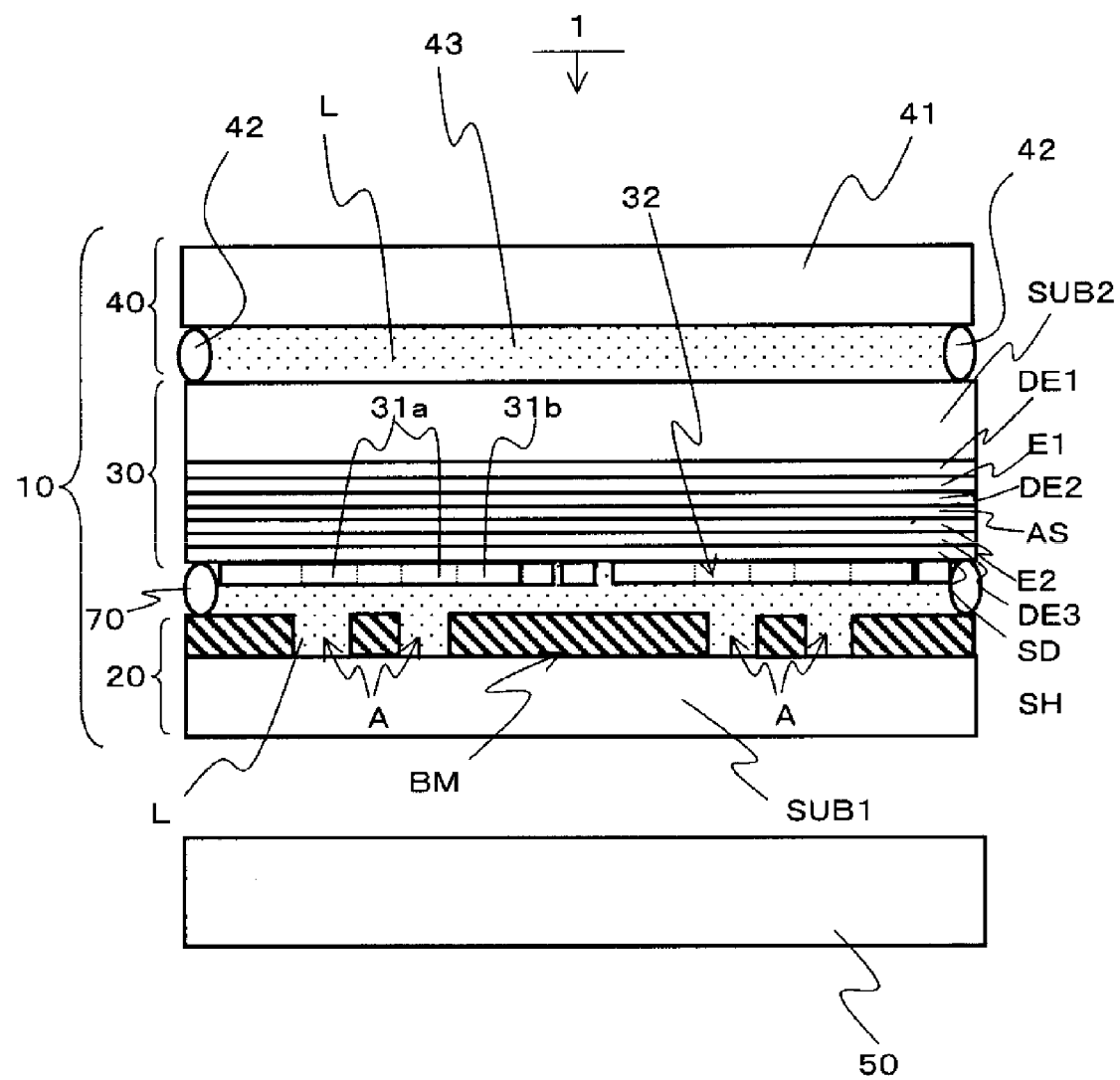
FIG. 5 shows a cross-sectional view of a main part of the display panel shown in FIG. 1 together with an illumination device.
Figure 6:
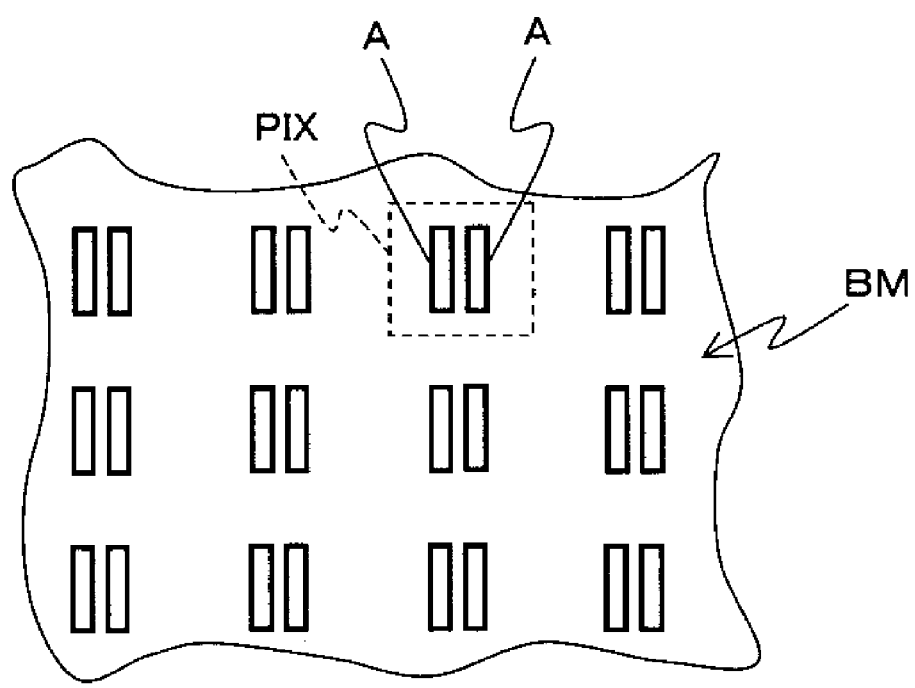
FIG. 6 is a plan view of a first substrate shown in FIG. 1 as seen from the side of a display plane of the display device.

Now, with reference to FIG. 5 and FIG. 6, a cross-sectional structure of the display panel 10 will be described. FIG. 5 shows a cross-section of a main part of the display panel 10 shown in FIG. 1 together with the illumination device 50. FIG. 6 is a plan view of the first substrate 20 shown in FIG. 1 as seen from the display plane of the display device 10.

First, the second substrate 30 will be described. For the sake of convenience, it is assumed that a surface of the second substrate 30 facing the first substrate 20 is a "top surface".

The second substrate 30 includes a light-transmissive substrate SUB2 formed of glass or the like and a dielectric layer DE1 provided by vapor deposition on a top surface of the light-transmissive substrate SUB2. The dielectric layer DE1 is formed of, for example, $SiO_2$ or $Si_3N_4$.

On a top surface of the dielectric layer DE1, a first conductive layer E1 is provided by vapor deposition and the plurality of scanning lines GL are formed in a pattern. A part of the scanning line GL in each pixel PIX forms the gates of the thin film transistors TFT.

On a top surface of the first conductive layer E1, a dielectric layer DE2 is provided by vapor deposition. The dielectric layer DE2 is formed of, for example, $SiO_2$ or $Si_3N_4$.

On a top surface of the dielectric layer DE2, an amorphous silicon layer AS is provided by vapor deposition and the sources, the drains and channel regions of the thin film transistors TFT are formed in a pattern.

On a top surface of the amorphous silicon layer AS, a second conductive layer E2 is provided by vapor deposition and the plurality of data lines DL are formed in a pattern. A part of the second conductive layer E2 has a contact point to source regions and drain regions of the thin film transistors TFT.

The capacitors C each include a flat plate formed by the first conductive layer E1 and the second conductive layer E2 and a dielectric material held therebetween.

On a top surface of the second conductive layer E2, a dielectric layer DE3 is provided by vapor deposition.

On a top surface of the dielectric layer DE3, a sacrificial mechanical layer SD is provided by vapor deposition. The sacrificial mechanical layer SD and the dielectric layer DE3 have conduction holes (not shown) so as to electrically connect the actuator section 35 to the second dielectric layer E2.

On a top surface of the sacrificial mechanical layer SD, a shutter mechanism section forming layer SH is provided by vapor deposition and is formed into the shape of the shutter section 31 and the actuator section 35. The shutter mechanism section 32 thus formed is fixed to the second substrate 30 via the conduction holes (not shown). Since the sacrificial mechanical layer SD is removed, a gap is formed between the shutter section 31 and the dielectric layer DE3, and thus the shutter section 31 is movably supported by the actuator section 35.

The various elements and various layers including the shutter mechanism section 32 formed on the light-transmissive substrate SUB2 are examples of this embodiment. According to the present invention, the structure of each of the elements and layers formed on the light-transmissive substrate SUB2 is not limited to that described above.

Now, the first substrate 20 will be described. For the sake of convenience, it is assumed that a surface of the first substrate 20 facing the second substrate 30 is a "top surface". The first substrate 20 includes the light-transmissive substrate SUB1 formed of glass or the like and the light-absorptive resin film BM provided by vapor deposition on a top surface of the light-transmissive substrate SUB1. The light-absorptive resin film BM is formed of a light-absorptive material such as, for example, carbon black, titanium black or the like.

The light-transmissive sections A are formed in the light-absorptive resin film BM, at a position corresponding to each pixel PIX. The light-transmissive sections A are areas where the light-absorptive resin film BM has been removed. As shown in FIG. 6, the light-transmitting sections A are each rectangular, and two light-transmitting sections A are provided parallel to each other in correspondence with each pixel PIX.

Now, the impact absorption section 40 will be described. The light-transmissive substrate 41 and the second substrate 30 are brought together with the sealing section 42. The accommodation space 43 (predetermined gap) is formed by the light-transmissive substrate 41, the second substrate 30 and the sealing section 42. The impact absorption section 40 includes the light-transmissive substrate 41, the sealing section 42 and the accommodation space 43.

To the space between the first substrate 20 and the second substrate 30 having the above-described structure, and also to the accommodation space 43, the work fluid L is respectively injected through the first injection opening 71 and the second injection opening 44 close to the first injection opening 71. The first injection opening 71 and the second injection opening 44 are closed with a sealing material (not shown) when the injection of the work fluid is finished.

The display panel 10 of the display device 1 in this embodiment according to the present invention includes the impact absorption section 40, which includes the light-transmissive substrate 41 located to face the second substrate 30 while there is a gap between the substrates 41 and 30, the sealing section 42 formed to be frame-like between the light-transmissive substrate 41 and the second substrate 30, and the accommodation space 43 formed by the light-transmissive substrate 41, the second substrate 30 and sealing section 42. Therefore, the impact applied to the display panel 10 is dispersed by the impact absorption section 40. As a result, the display device 1 can improve the impact resistance thereof.

In the display device 1 in this embodiment according to the present invention, the second injection opening 44 is located close to the first injection opening 71 (at the same position when seen in a plan view, or at a position overlapping the first injection opening 71 at least partially when seen in a plan view). Therefore, the work fluid L can be injected through both of the second injection opening 44 and the first injection opening 71 at the same time. As a result, the production process of the display device 1 can be simplified.

(Modification 1)

Figure 7:
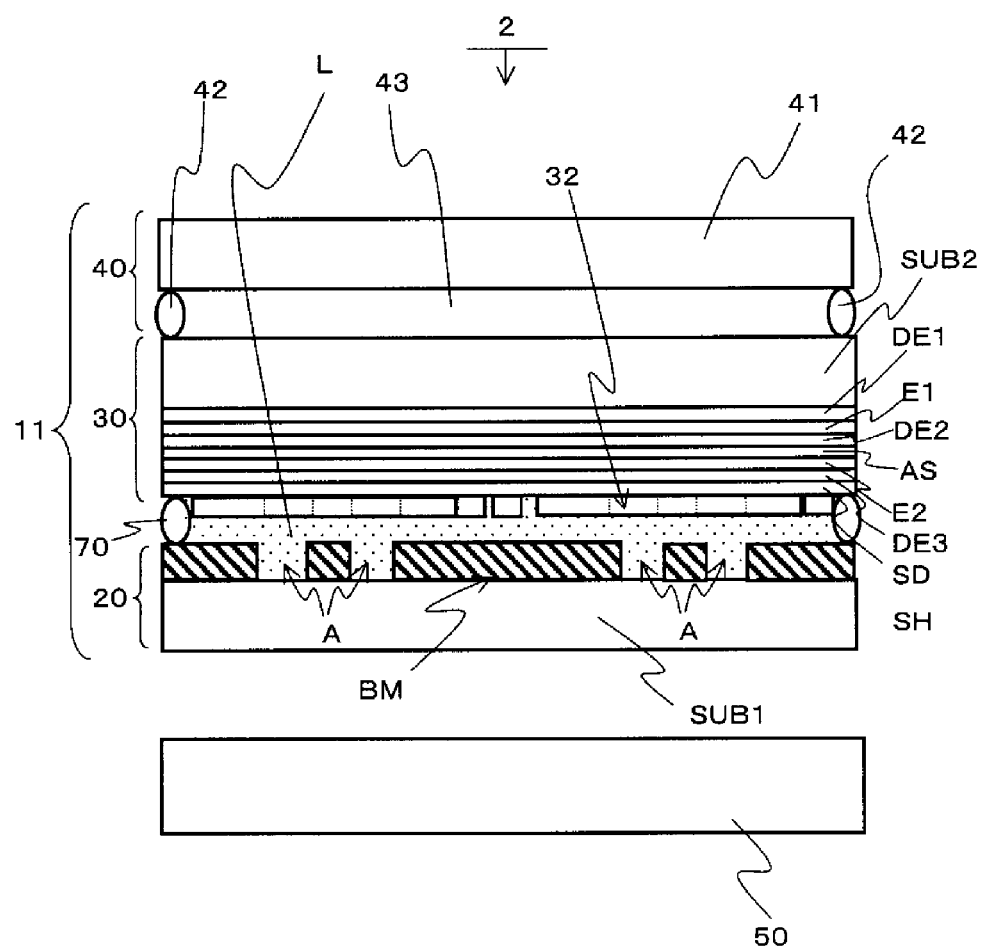
FIG. 7 shows a cross-sectional view of a main part of a display panel of a display device in Modification 1 together with an illumination device.

Now, with reference to FIG. 7, Modification 1 of the display device 1 in the above-described embodiment according to the present invention will be described. FIG. 7 shows a cross-sectional view of a main part of a display panel 11 of a display device 2 in Modification 1 together with the illumination device 50.

In the display device 1 in the above-described embodiment according to the present invention, the work fluid L is sealed in the accommodation space 43 as an impact absorption material. Unlike the display device 1, the display device 2 in Modification 1 does not have any impact absorption material sealed in the accommodation space 43. Specifically, in Modification 1, the accommodation space 43 is filled with air (atmospheric air).

Regarding the other elements, the display device 2 is the same as those in the above-described embodiment, and identical elements to those in the above-described embodiment bear identical reference numerals thereto.

In the display device 2 in Modification 1, the air in the accommodation space 43 acts as an impact absorption material. Therefore, the display device 2 can improve the impact resistance thereof like the display device 1 in the above-described embodiment according to the present invention.

(Modification 2)

Figure 8:
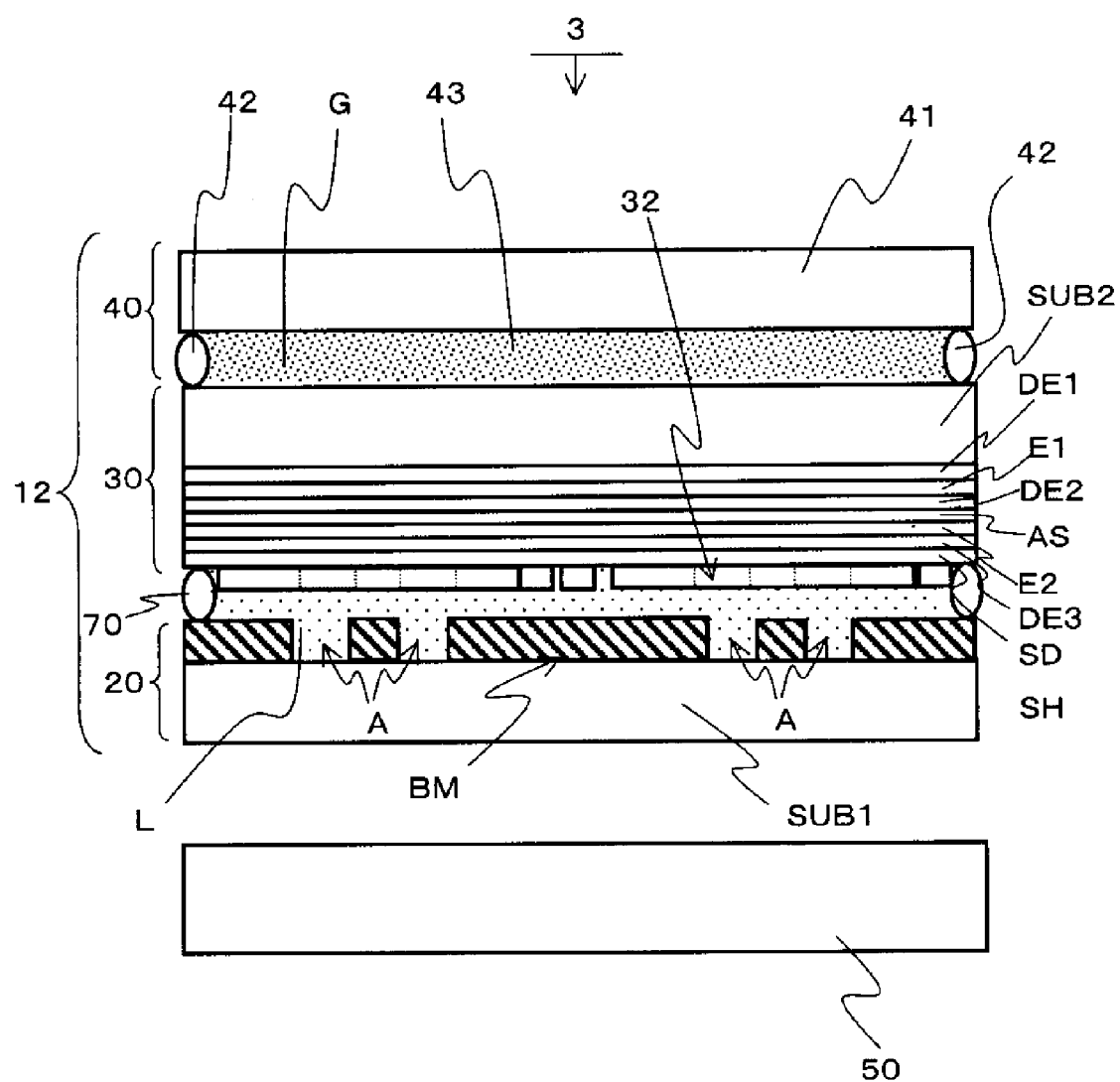
FIG. 8 shows a cross-sectional view of a main part of a display panel of a display device in Modification 2 together with an illumination device.

Now, with reference to FIG. 8, Modification 2 of the display device 1 in the above-described embodiment according to the present invention will be described. FIG. 8 shows a cross-sectional view of a main part of a display panel 12 of a display device 3 in Modification 2 together with the illumination device 50.

In the display device 1 in the above-described embodiment according to the present invention, the work fluid L is sealed in the accommodation space 43 as an impact absorption material. Unlike the display device 1, the display device 3 in Modification 2 seals a gel material G as the impact absorption material in the accommodation space 43.

Regarding the other elements, the display device 3 is the same as those in the above-described embodiment, and identical elements to those in the above-described embodiment bear identical reference numerals thereto.

In the display device 3 in Modification 2, the gel material G in the accommodation space 43 acts as an impact absorption material. Therefore, the display device 3 can improve the impact resistance thereof like the display device 1 in the above-described embodiment according to the present invention.

(Modification 3)

Figure 9:
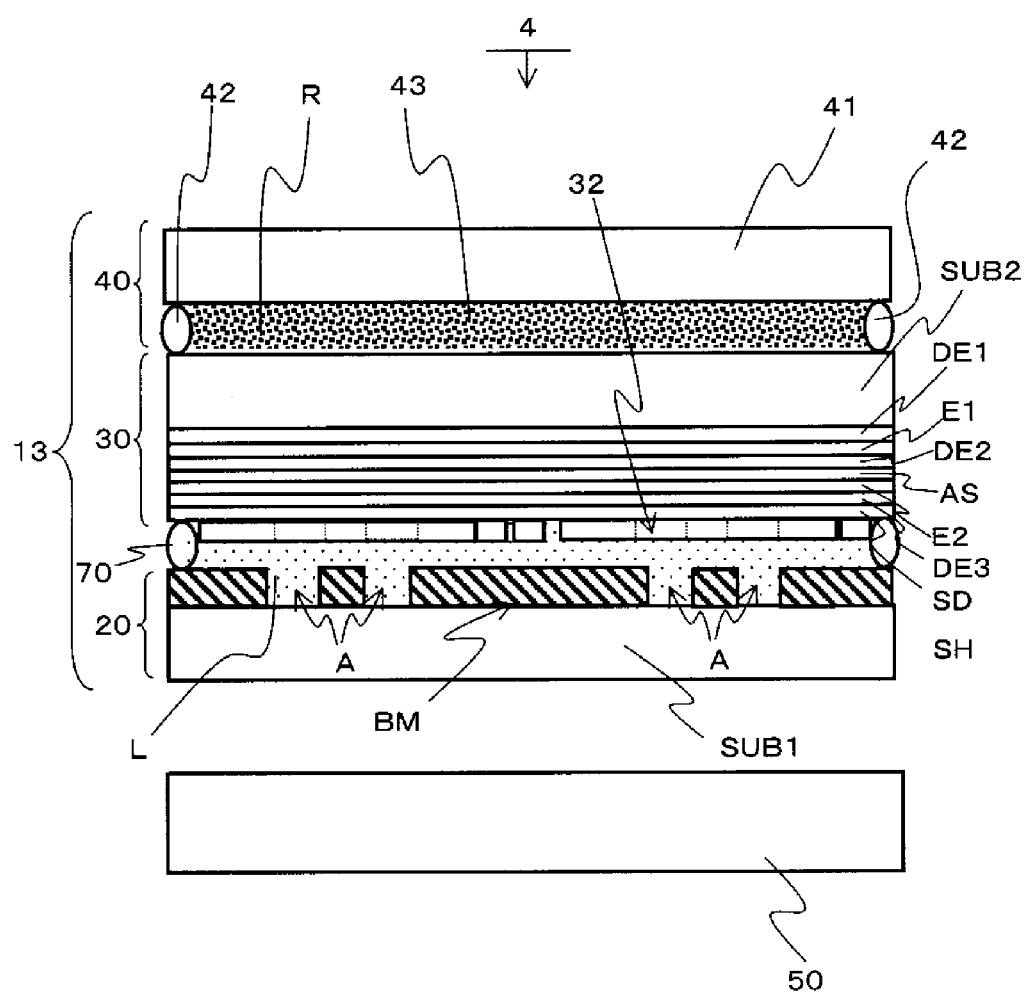
FIG. 9 shows a cross-sectional view of a main part of a display panel of a display device in Modification 3 together with an illumination device.

Now, with reference to FIG. 9, Modification 3 of the display device 1 in the above-described embodiment according to the present invention will be described. FIG. 9 shows a cross-sectional view of a main part of a display panel 13 of a display device 4 in Modification 3 together with the illumination device 50.

In the display device 1 in the above-described embodiment according to the present invention, the work fluid L is sealed in the accommodation space 43 as an impact absorption material. Unlike the display device 1, the display device 4 in Modification 3 seals a reaction-curable resin R as the impact absorption material in the accommodation space 43.

Regarding the other elements, the display device 4 is the same as those in the above-described embodiment, and identical elements to those in the above-described embodiment bear identical reference numerals thereto.

The reaction-curable resin R is, for example, condensation-curable silicone rubber (RTV rubber). Such a reaction-curable resin R can be cured after being sealed in the accommodation space 43. Thus, the resin can be sealed in the accommodation space 43 such that air bubbles are not mixed therein.

In the display device 4 in Modification 3, the reaction-curable rubber R in the accommodation space 43 acts as an impact absorption material. Therefore, the display device 4 can improve the impact resistance thereof like the display device 1 in the above-described embodiment according to the present invention.

(Modification 4)

Figure 10:
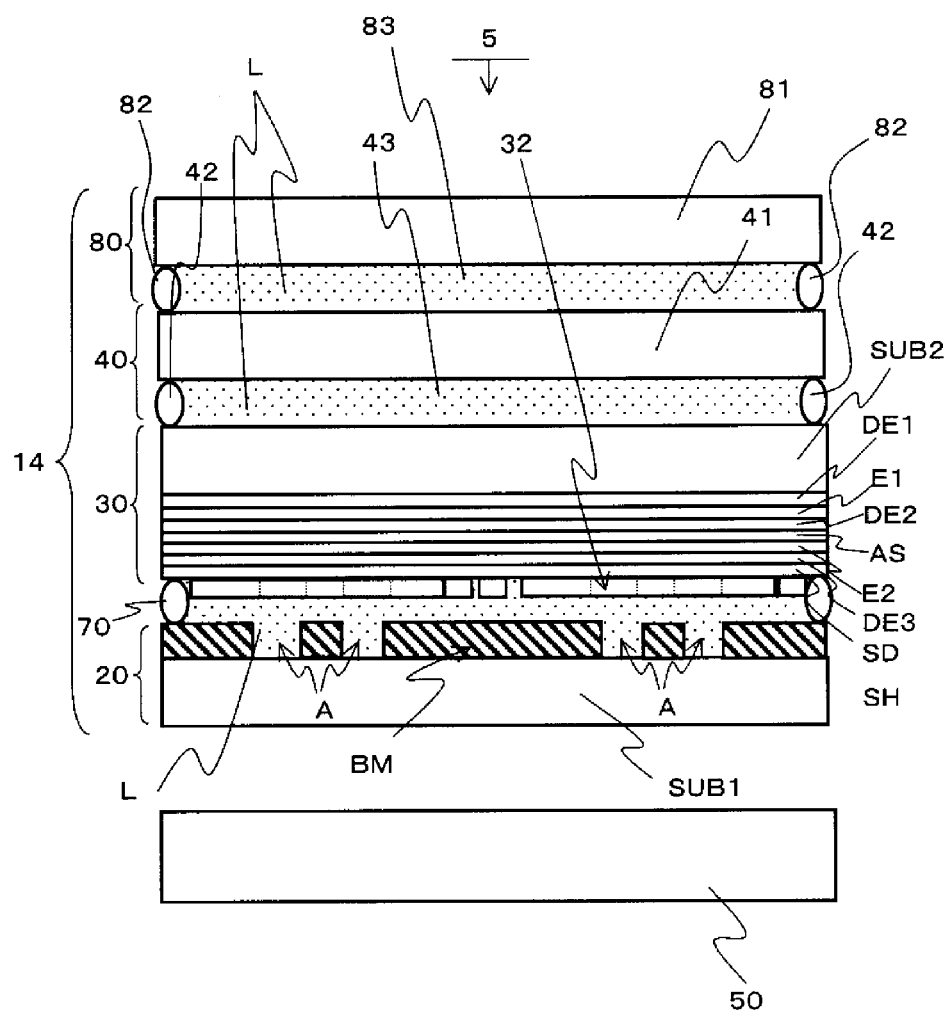
FIG. 10 shows a cross-sectional view of a main part of a display panel of a display device in Modification 4 together with an illumination device.

Now, with reference to FIG. 10, Modification 4 of the display device 1 in the above-described embodiment according to the present invention will be described. FIG. 10 shows a cross-sectional view of a main part of a display panel 14 of a display device 5 in Modification 4 together with the illumination device 50.

In the display device 1 in the above-described embodiment according to the present invention, the impact absorption section 40 is of one layer. Unlike the display device 1, the display device 5 in Modification 4 includes impact absorption sections 40 and 80 in two layers.

Regarding the other elements, the display device 5 is the same as those in the above-described embodiment, and identical elements to those in the above-described embodiment bear identical reference numerals thereto.

The display device 5 includes the impact absorption section 40 and an impact absorption section 80 stacked on the display plane side of the light-transmissive substrate 41 of the impact absorption section 40. The impact absorption section 80 includes a light-transmissive substrate 81 located to face the light-transmissive substrate 41 while there is a gap between the substrates 81 and 41, a sealing section 82 formed to be frame-like between the light-transmissive substrate 41 and the light-transmissive substrate 81, and an accommodation space 83 formed by the light-transmissive substrate 41, the light-transmissive substrate 81 and the sealing section 82. The accommodation space 83 has a work fluid L injected thereinto as the impact absorption material.

In the display device 5 in Modification 4, waves of the impact are reflected and refracted more by the impact absorption sections 40 and 80 stacked in two layers. Therefore, as compared with the display device 1 in the above-described embodiment including the impact absorption section 40 of one layer, the display device 5 can further improve the impact resistance thereof.

In Modification 4, the accommodation spaces 43 and 83 having the impact absorption material sealed therein, and the light-transmissive substrates 41 and 81 harder than the accommodation spaces 43 and 83, are located alternately. Since the soft elements (i.e., the accommodation spaces 43 and 83) and the hard elements (i.e., the light-transmissive substrates 41 and 81) are continuous, the waves of the impact are dispersed. This also improves the impact resistance in Modification 4.

In the display device 5 in Modification 4, the work fluid L is sealed in the accommodation spaces 43 and 83 as an impact absorption material. The present invention is not limited to this, and the impact absorption materials L, G or R described above may be sealed in the accommodation spaces 43 and 83.

The display device 5 in Modification 4 includes the impact absorption sections 40 and 80 in two layers. The present invention is not limited to this, and the impact absorption sections may be stacked in three or more layers.

(Modification 5)

Figure 11:
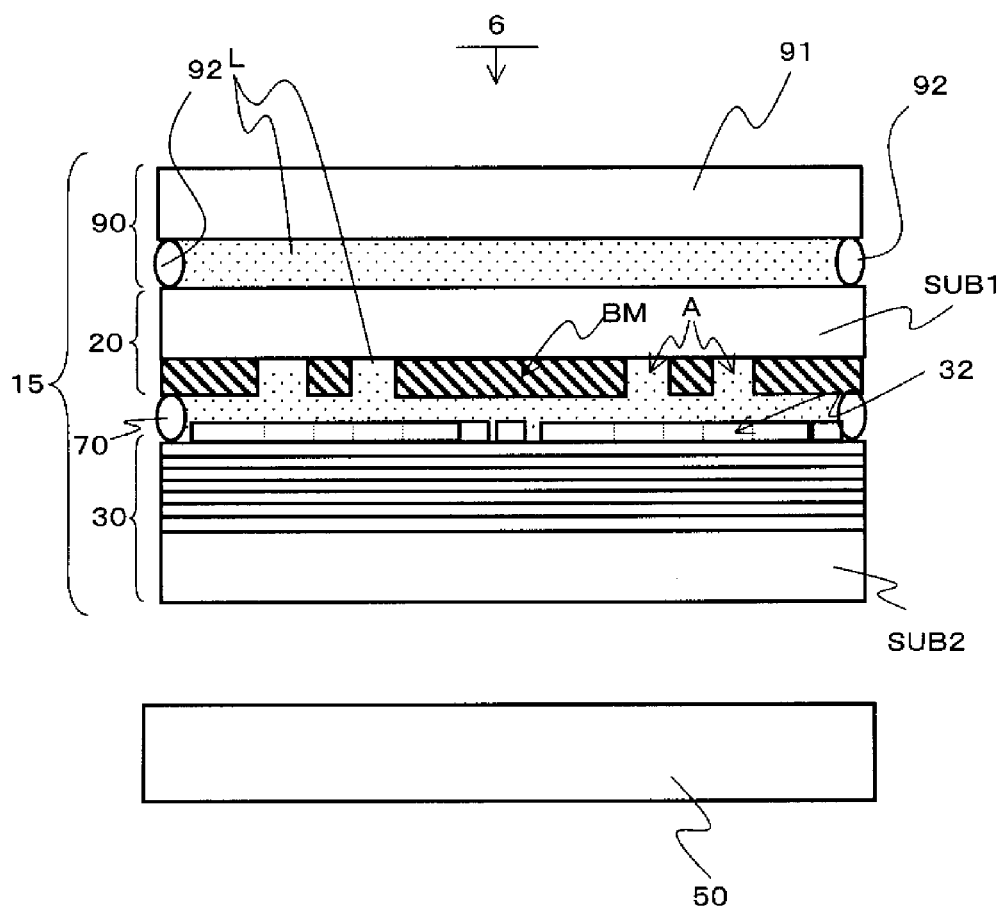
FIG. 11 shows a cross-sectional view of a main part of a display panel of a display device in Modification 5 together with an illumination device.

Now, with reference to FIG. 11, Modification 5 of the display device 1 in the above-described embodiment according to the present invention will be described. FIG. 11 shows a cross-sectional view of a main part of a display panel 15 of a display device 6 in Modification 5 together with the illumination device 50.

In the display device 1 in the above-described embodiment according to the present invention, the first substrate 20 is provided in the rear part of the display panel 10. Unlike the display device 1, the display device 6 in Modification 5 includes the second substrate 30 provided in the rear part of the display panel 15.

Regarding the other elements, the display device 6 is the same as those in the above-described embodiment, and identical elements to those in the above-described embodiment bear identical reference numerals thereto.

The display device 6 includes an impact absorption section 90. The impact absorption section 90 includes a light-transmissive substrate 91 located to face the first substrate 20 while there is a gap between the substrates 91 and 20, a sealing section 92 formed to be frame-like between the first substrate 20 and the light-transmissive substrate 91, and an accommodation space 93 formed by the first substrate 20, the light-transmissive substrate 91 and the sealing section 92. The accommodation space 93 has a work fluid L injected thereinto as the impact absorption material.

In the display device 6 in Modification 5, the impact applied to the display panel 15 is dispersed by the impact absorption section 90. As a result, the display device 6 can improve the impact resistance thereof.

In Modification 5 also, as described above in Modification 4, the impact absorption sections may be stacked in two or more layers.

In the display devices 1, 2, 3, 4, 5 and 6 in the embodiments according to the present invention, the light-absorptive resin film BM is formed in the first substrate 20. The present invention is not limited to this. Specifically, the light-absorptive resin film BM may be formed in the second substrate 30.

As described above, a display panel of a display device in an embodiment according to the present invention includes an impact absorption section, which includes a light-transmissive substrate located to face a first substrate or a second substrate while there is a gap between the substrates, a sealing section formed to be frame-like between the light-transmissive substrate and the first substrate or the second substrate, and an accommodation space formed by the light-transmissive substrate, the first substrate or the second substrate and the sealing section. Therefore, the impact applied to the display panel is dispersed by the impact absorption section. As a result, the display device can improve the impact resistance thereof.

The present invention made by the present inventors has been specifically described by way of embodiments thereof. The present invention is not limited to the above-described embodiments and may be variously altered without departing from the gist thereof.

What is claimed is:

1. A display device comprising:
   a first substrate;
   a second substrate facing the first substrate;
   a plurality of pixels;
   a shutter mechanism section formed on the second substrate in correspondence with each of the pixels, and having a movable shutter section for controlling a light transmittance of each of the pixels;
   a fluid sealed in a space between the first substrate and the second substrate; and
   an impact absorption section including a third substrate located to face one substrate among the first substrate and the second substrate, on the side opposite to the side on which the fluid is located, a sealing section for bringing together the one substrate and the third substrate, and a predetermined gap formed among the one substrate, the third substrate and the sealing section.

2. The display device according to claim 1, wherein the predetermined gap is filled with air.

3. The display device according to claim 1, wherein the impact absorption section includes a fourth substrate facing the third substrate on the side opposite to the one substrate and a second predetermined gap formed between the third substrate and the fourth substrate.

4. The display device according to claim 1, wherein:
   the impact absorption section includes a plurality of fourth substrates facing each other and located to face the third substrate on the side opposite to the one substrate and a plurality of second predetermined gaps formed between the third substrate and one of the plurality of fourth substrates and between the plurality of fourth substrates; and
   the plurality of fourth substrates and the plurality of second predetermined gaps are located alternately.

5. The display device according to claim 1, wherein the one substrate is the first substrate.

6. The display device according to claim 1, wherein the one substrate is the second substrate.

7. The display device according to claim 1, further comprising an illumination section located to face the other substrate among the first substrate and the second substrate which is not the one substrate;
   wherein the illumination section outputs light toward the plurality of pixels from the side of the other substrate.

8. The display device according to claim 7, wherein:
   the first substrate includes a light-blocking film having a plurality of first openings;
   each of the plurality of pixels has at least one of the plurality of first openings;
   the shutter section has at least one second opening; and
   each of the plurality of pixels transmits light from the illumination section via the first opening and the second opening.

9. The display device according to claim 1, wherein the predetermined gap is filled with an impact absorption material.

10. The display device according to claim 9, wherein the impact absorption material is a gel material.

11. The display device according to claim 9, wherein the impact absorption material is a reaction-curable resin.

12. The display device according to claim 1, wherein a fluid of the same material as that of the fluid sealed in the space between the first substrate and the second substrate is sealed in the predetermined gap.

13. The display device according to claim 2, wherein the fluid is silicone oil or fluorine oil.

14. The display device according to claim 2, wherein:
   a first injection opening for injecting the fluid into the space between the first substrate and the second substrate and a second injection opening for injecting the fluid into the predetermined gap are provided; and
   the first injection opening and the second injection opening overlap each other at least partially when seen in a plan view.

15. The display device according to claim 14, wherein the first injection opening and the second injection opening are formed at the same position when seen in a plan view.

* * * * *